United States Patent [19]

Lapp

[11] 4,298,248
[45] Nov. 3, 1981

[54] PIVOTAL SUPPORT WITH INDEPENDENT ADJUSTING ELEMENTS AND LOCKING MEANS

[75] Inventor: Roger H. Lapp, Silver Spring, Md.

[73] Assignee: The United States of America as represented by the Secretary of the Navy, Washington, D.C.

[21] Appl. No.: 150,389

[22] Filed: May 16, 1980

[51] Int. Cl.³ .............................................. G02B 5/08
[52] U.S. Cl. .................... 350/310; 248/179; 248/481; 350/288
[58] Field of Search ............... 350/288, 310; 248/178, 248/179, 479, 481

[56] References Cited

U.S. PATENT DOCUMENTS

| | | | |
|---|---|---|---|
| 1,863,060 | 6/1932 | Knutson . | |
| 2,461,191 | 2/1949 | Wolff | 248/180 |
| 2,465,751 | 3/1949 | Robins | 248/481 |
| 3,204,471 | 9/1965 | Rempel | 350/288 X |
| 3,428,915 | 2/1969 | Leone et al. | 350/252 |
| 3,478,608 | 11/1969 | Met | 350/310 |
| 3,565,515 | 2/1971 | DeMey | 350/296 |
| 3,642,353 | 2/1972 | Field | 350/310 |
| 3,751,139 | 8/1973 | Malherbe | 350/288 |
| 3,953,113 | 4/1976 | Shull | 350/288 |
| 4,023,891 | 5/1977 | Chadwick | 350/288 |

FOREIGN PATENT DOCUMENTS 611166  6/1978  U.S.S.R. .............................. 350/288

Primary Examiner—F. L. Evans

[57] ABSTRACT

An optical element support capable of pivoting an optical element on its horizontal and vertical axes. The pivoting adjustments are facilitated by spaced threaded rods screwed into a support element and abutting a surface element extending from a receptacle containing the optical element. The surface element is capable of flexure without causing distortion of the receptacle. The optical element support has a locking element which prevents pivoting in the locking mode.

16 Claims, 3 Drawing Figures

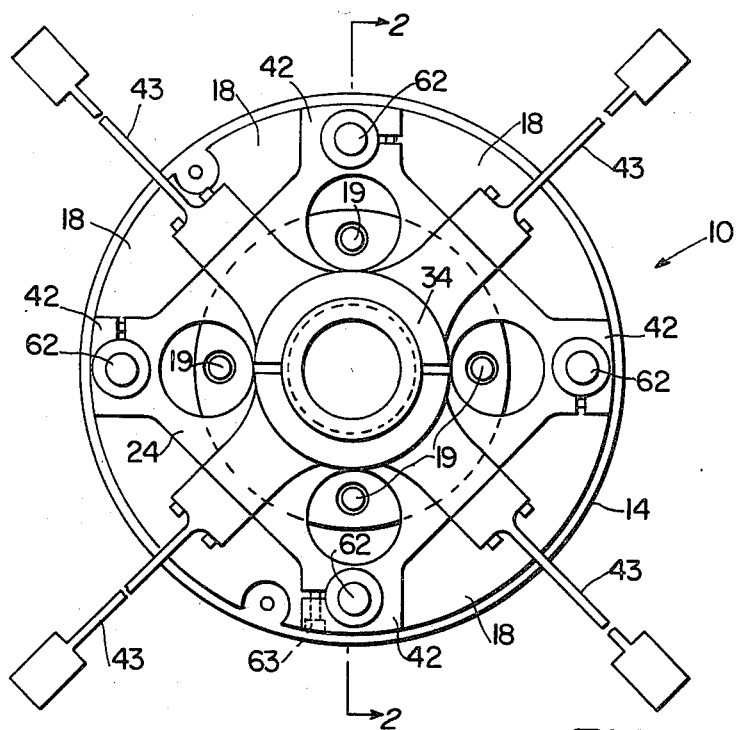
FIG. 1
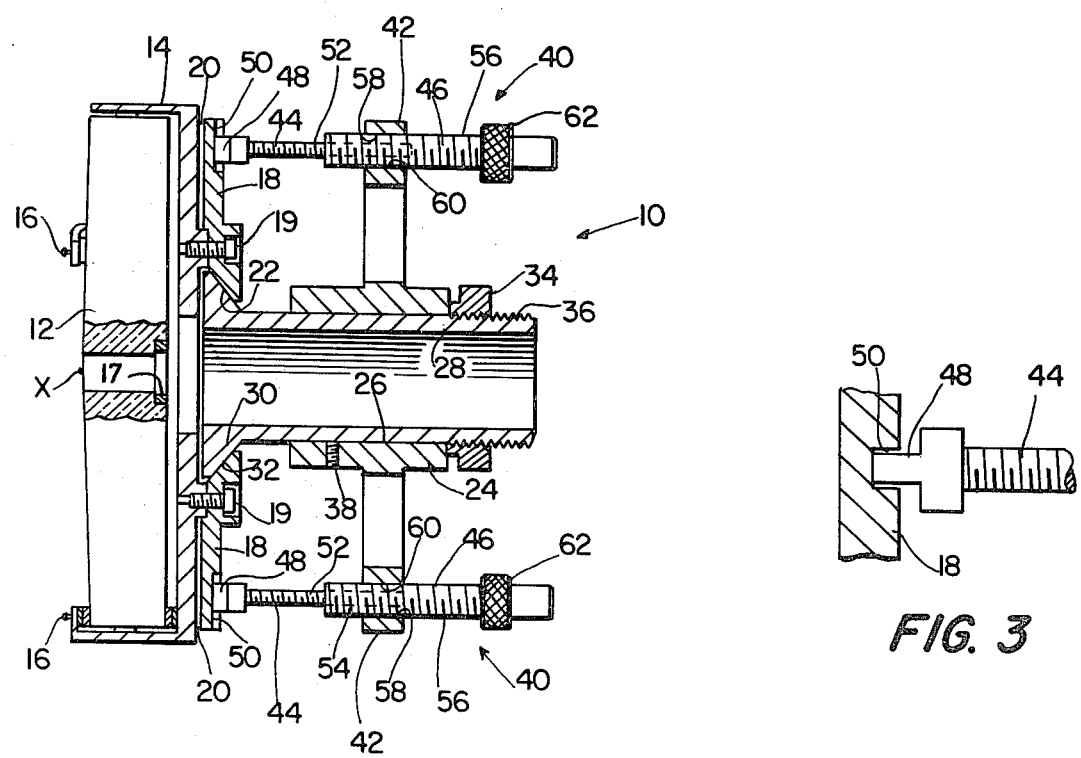
FIG. 2
FIG. 3

PIVOTAL SUPPORT WITH INDEPENDENT ADJUSTING ELEMENTS AND LOCKING MEANS

BACKGROUND OF THE INVENTION

The rigid yet adjustable mounting of optical elements such as mirrors or lenses in a shock and vibration permeated environment, such as aboard a ship, is a constant goal in optical installations. Examples of such installations are lasers, general electro-optical equipment, TV cameras, tracking devices, documentary data cameras and other ship installed equipment. Optical element supports used within laser systems, for example, must be capable of minute independent angular adjustments in the horizontal and vertical directions to direct a light beam and yet have secured locking means which will endure shock and vibration without changing the angular adjustment or inducing distortion or strain into the optical element.

In review of the prior art, Wolff, U.S. Pat. No. 2,461,190 discloses an adjustable mount for mirrors having a pressure surface spaced from the mounting surface by a reduced neck portion which reduces the strain and distortion transmitted to the mirror during adjustment. Unfortunately, for those interested in an easily pivoted mount, no pivot socket or universal joint with a locking capability for resisting vibration is disclosed in Wolff. Knutson, U.S. Pat. No. 1,863,060, discloses a mirror mount having a bolt-type element with a locking nut which locks a universally pivoting joint in place for resisting vibration. However, Knutson's device has no provision for an adjusting means which facilitates minute angular adjustment and positions the mirror independently of the locking bolt.

SUMMARY OF THE INVENTION

The present invention is an optical element support having pivotally connecting means which allows universal pivoting, and has a locking capability, and means independent of the pivotally connecting means for angular adjustments of an optical element. The optical element support comprises a fixed support element, an optical element receptacle operably pivoting on the support element and means for pivotally connecting the optical element receptacle relative to the support element. The pivotally connecting means includes a tubular centerpost which moves axially between a locking and a pivoting mode. While in the pivoting mode, sets of threaded rods position the optical element receptacle angularly. The sets of threaded rods abut an adjusting surface on an annular plate spaced from the optical element receptacle so as to preclude distortion of the optical element receptacle and optical element.

OBJECTS OF THE INVENTION

It is therefore an object of this invention to provide a locking adjustable optical support.

A further object is to provide a locking adjustable optical element support for use with lasers and which is resistant to shock and vibration such as found aboard a ship.

Another object is to provide locking adjustable optical element support which allows quick, minute, micro radian, angular adjustment.

A still further object of the invention is to provide a locking adjustable optical element support wherein the angular adjustment means is substantially independent of the pivotal locking means so that engagement and disengagement of the locking means does not effect the angular adjustment of the optical element.

BRIEF DESCRIPTION OF THE DRAWINGS

FIG. 1 is a back view of a preferred embodiment of the present invention shown with the support extension brackets, but without the optical element.

FIG. 2 is a side view of the embodiment taken in section generally along line 2—2 of FIG. 1, without the support extension brackets being shown.

FIG. 3 is a slightly enlarged view of a portion of the embodiment of FIG. 1 showing the insertion of the rectangular tang 48 into the plate 18; looking radially inwardly towards the center of the embodiment.

DESCRIPTION OF THE PREFERRED EMBODIMENTS

Referring now to the drawings, wherein like reference characters designate like or corresponding parts throughout the different views, the preferred embodiment of FIG. 2 shows an optical element support 10 comprising an optical element 12, which may be a mirror, lens, prism, etc., engaged by an optical element mount such as a cup-like receptacle 14 and a plurality of clamps 16. The clamps 16 are fixedly secured to the receptacle 14 and firmly secure the optical elements 12 within the receptacle 14. However, in certain minimal precision applications, the optical element 12 may be mounted by other means such as by utilizing a support surface for an optical element mount extending around the periphery of the optical element, and a variety of attachment means, including clamps, clips, screws, adhesives, etc., can be utilized to secure the optical element to the support surface. However, the specially configured optical element receptacle 14, shown in FIG. 2, is optimal as it permits extremely tight locking of the optical element 12 without customary optical element deformation.

An annular plate 18 is securely mounted to the rear surface of the receptacle 14 by a plurality of bolts 19 so that a space or gap 20 is formed between the major portion of the receptacle 14 and the plate 18. The annular plate provides an abutting surface for the adjustment means which will be described in more detail later herein. A frustoconical annular receptacle surface 22 is located in the center of plate 18, which facilitates pivotal movement between receptacle 14 and a support frame or element 24. The support element 24 is somewhat square shaped with a tubular inward portion.

Several elements, hereinafter to be described in detail, provide a pivotally connecting means which allows the receptacle 14 to pivot relative to the stationary support frame or element 24 in the non-locking or pivoting mode and rigidly prevents pivotal movement in the locking mode. An axially slidable centerpost 28 is centrally situated in a tubular cavity 26 in the support frame or element 24. The centerpost 28 is tubular with the opening having the capability of passing light through the optical element 12 since there are no interceding elements which would block the light rays. A reticle 17 is used to align optical element 12 by looking through the correspondingly aligned apertures in optical element 12, receptacle 14, and centerpost 28. At one end of the centerpost 28 is an outwardly extending flange 30 having a surface 32 defining a portion of a spherical surface. The center of curvature of the partial spherical surface 32, as seen in FIG. 2, is at a point X in the plane defined by the surface of the optical element 12. Therefore, the center of the front surface of the optical element (optical center or vertex) coincides with the center of rotation of the mirror during adjustment. Due to the sliding engagement between the partial spherical surface 32 and the annular receptacle surface 22, pivotal motion is permitted between the receptacle 14 and the support element 24 when the centerpost 28 is in its forward position defining a nonlocking or pivoting mode. It should be understood that while the engagement surfaces for the annular receptacle surface 22 and the outwardly extending flange 30 are described as being frustoconical and a partial spherical surface, respectively, a variety of loosely interacting bevelled or curved surfaces could be utilized to achieve somewhat less satisfactory results. The locking mode of the pivotally connecting means is achieved by shifting the centerpost 28 rearwardly within the tubular cavity 26 so that the partial spherical surface 32 engages the annular receptacle surface 22. This axial, locking movement is facilitated by a locking nut 34 which engages threads 36 on the centerpost 28 thereby causing the centerpost to move to the right as seen in FIG. 2. The centerpost is prevented from rotational movement by an anti-rotational pin 38 which slides within an axial groove (not shown) to limit the centerpost to rectilinear movement. Thus it can be appreciated by those skilled in the art that the pivotally connecting means, comprising the annular receptacle surface 22, the spherical surface 32 on the flange 30, the centerpost 28 and the locking nut 34, provides a means for both pivotally mounting the receptacle 14 relative to the support element 24 and locking it securely in place.

While the pivotally connecting means is in the nonlocking or pivoting mode, plural adjustment means 40 provide the means for angularly adjusting optical element receptacle 14 relative to support element 24. Four adjustment means 40, two of which are shown in FIG. 2, are positioned ninety degrees apart by four support appendages 42 in support elements 24 extending radially from the center of the support element 24. In addition, spaced 45° from the appendages 42, are four support extensions 43 as shown in FIG. 1. Extensions 43 are attachable to an external framework or housing which is not shown. Furthermore, while four adjustment means 40 are described, three or more could be utilized depending upon the precision desired and the size of the optical element. However, four adjustment means 40 are the optimum number since one can be placed every ninety degrees on the orthogonal axes to facilitate independent adjustment in the horizontal or vertical directions; i.e. if the optical element is positioned correctly in the vertical direction, only the horizontal adjustments need to be made.

While there are four adjustment means 40 in the preferred embodiment only one will be described in detail. The adjustment means 40 includes a primary threaded rod 44 and a secondary threaded rod 46. The primary threaded rod 44 has two ends. The first end includes a rectangular protrusion or tang 48. The tang 48 is flat sided and abuts and slides in a receiving slot 50 disposed in the peripheral edge of the annular plate 18 thereby preventing rotation of the primary threaded rod 44 relative to the annular plate 18, but allowing radial sliding of the associated tang 48 relative to the longitudinal axis of the centerpost 28. As the mounting receptacle 14 pivots, the tang 48 slides radially within the slot 50 in the annular plate 18, thereby relieving the elements 18, 44 of lateral stresses. The primary threaded rod 44 is threaded through substantially its entire length by external threads 52. These threads 52 mate with threads 54 on the interior of a tubular portion at the first end of secondary threaded rod 46. Beginning at the first end of the secondary threaded rod 46 and extending along a major portion thereof are external threads 56. These external threads 56 mate with internal threads 58 in a corresponding aperture 60 in each of the support appendages 42. A knob 62 is located on the second end of the secondary threaded rod 46 to facilitate manual rotation. However, a screw slot or a socket for an Allen wrench could be formed within the knob 62 to provide for mechanical adjustment. The threads 56, 58 and the threads 52, 54 are threaded in the same direction of rotation but have different ratios of threads per inch. For example, threads 56, 58 may have 28 right hand threads per inch while threads 52, 54 may have 32 right hand threads per inch. When secondary threaded rod 46 is rotated, primary threaded rod 44 remains stationary. Consequently, when knob 62 is rotated one revolution, thread 56 advances 0.0357 inches while thread 52 retreats 0.0313 inches causing a net advance by tang 48 of 0.0044 inch per revolution of knob 62, which provides a small micro radian adjustment without the need for ultra fine threads. The secondary threaded rod is prevented from rotation, once adjusted by clamps 63, one of which is shown in FIG. 1.

One of the major features of the present invention is the construction and position of the annular plate 18. Since the tangs 48 in each of the adjustment means 40, in conjunction with a corresponding point within the pivotally connecting means, may not lie in the same plane, the annular plate 18 is formed of a material which will accommodate such non-alignment of the tangs 48 and flex or bend accordingly. In view of this flexure or bending, the annular plate 18 is attached to the mounting receptacle 14 at a point spaced from the location of the slots 50 thereby defining a space or gap 20 which may accommodate the annular plate 18 after it has been deformed. It can be appreciated by those skilled in the art that since annular plate 18 accommodates the unbalanced thrusting forces of the adjustment means 40, even if the mounting receptacle is locked up tightly, the optical element 12 will not be subjected to deformation. Although an annular plate is shown in the preferred embodiment, various other elements could be used to define an adjusting surface means which flexes independently of the mounting receptacle, such as protrusion elements (including tabs) extending from the mounting receptacle. However, extending such elements from the mounting receptacle is not optimal since it invites problems due to potential distortion of the receptacle.

In the assembly procedure, the proper location of locking nut 34 is first determined relative to threads 36 so as to properly position flange 30 in receptacle surface 22 in order to attain proper placement of optical element 12 once adjustment is completed. The locking nut 34 is then loosened slightly allowing centerpost 28 to slide axially to the left as seen in FIG. 2. This allows the pivotal, sliding motion between the partial spherical surface 32 on the centerpost flange 30 and the frustoconical annular receptacle surface 22. Once the pivotal connecting means is loosened slightly, the adjustment means 40 may be rotated utilizing knobs 62 to cause angular displacement in the corresponding horizontal or vertical direction; i.e. if only the vertical alignment need be changed, the adjustment means 40 positioned on the vertical axis are adjusted. Due to the configuration of the support assembly 10, movement of adjustment means 40 may cause locking or unlocking of the pivotally connecting means. Hence, the surfaces 22, 32 can be locked together either by turning knobs 62 in the forward direction an equal amount without turning the locking nut 34 or by turning nut 34. In the process of adjusting (and consequently locking/unlocking), knobs 62 may become difficult to turn as rods 44, 46 reach their elastic limit. To accommodate this, rods 44, 46 and tang 42 are made of anti-galling metals. It should be noted that during the adjustment process, as the turning of the knobs 62 causes angular adjustments of the optical element relative to the centerpost 28 about the vertex X. When the annular plate 18 changes its angular position, tangs 48 do not rotate but slide radially on the abutment surface within the slots 50. Once the optical element (e.g. mirror) is in its proper angular position, the locking nut 34 is returned to its proper location thereby positioning centerpost 28. When the centerpost 28 is properly positioned, the annular receptacle surface 22 will frictionally engage the partial spherical portion 32 and pull the annular plate 18 in a direction opposite to that imposed by the adjustment means 40, thereby locking the optical element (e.g. mirror) in place. It can be seen that due to the bending of the annular plate 18 permitted by the gap 20, even if the optical element support 10 is locked up tightly by large opposing internal forces, the optical element 12 (e.g. mirror) is not subject to deformation by these forces, a key feature of the present invention.

It should be understood, of course, that the foregoing disclosures relates only to a preferred embodiment of the invention and that numerous modifications or alternations may be made therein without departing from the spirit and the scope of the invention as set forth in the appended claims.

What is claimed is:

1. A device for supporting optical elements and adapted for angular adjustment comprising:
   a support element;
   an optical element mount operably supported by said support element;
   means for pivotally connecting said optical element mount to said support element having a locking and non-locking mode;
   means for providing an adjusting surface connected with said optical element mount, said adjusting surface means being capable of limited flexure without significantly effecting the position or causing distortion of the shape of said optical element mount;
   adjustment means movably connected to said support element and extending to said adjusting surface means for causing angular adjustment of the optical element mount;
   said pivotally connecting means including means for locking said pivotally connecting means whereby said optical element mount is substantially maintained in a fixed position relative to the support element in said locking mode.

2. The invention as set forth in claim 1 wherein said adjusting surface means has an abutting surface and said adjustment means slidably abuts said abutting surface whereby said adjustment means is capable of sliding movement substantially in the plane of said abutting surface means in at least one direction.

3. The invention as set forth in claim 1 wherein said pivotally connecting means comprises a centerpost and an annular receptacle, said annular receptacle having a pivoting surface and being attached to said optical element mount, said centerpost being in sliding engagement with said support element and having an outwardly extending flange which fits within said annular receptacle such that when said pivotally connecting means is in said non-locking mode, the annular receptacle pivots about the outwardly extending flange, and when said pivotally connecting means is in said locking mode, said outwardly extending flange forcefully engages, said pivoting surface of said annular receptacle.

4. The invention as set forth in claim 3 wherein said outwardly extending flange defines a portion of a spherical surface and wherein said optical mount has a mirror attached thereto such that the center of the curvature of the spherical surface substantially coincides with the surface of the mirror.

5. The invention as set forth in claim 3 wherein said centerpost has threads thereon and said locking means is a lock nut in threaded engagement therewith such that as said lock nut is moved inwardly towards said optical element mount said centerpost is caused to move axially such that said outwardly extending flange forcefully engages said pivoting surface so as to lock said optical element mount in place.

6. The invention set forth in claim 1 wherein said adjustment means comprises a plurality of threaded rod means for facilitating adjustment, said threaded rod means extending into and being in threaded engagement with said support element such that the turning of the threaded rod means will effect the angular positioning of the optical element mount.

7. The invention as set forth in claim 6 including an optical element supported by said optical element mount and wherein said plurality of threaded rod means are substantially equally spaced radially from the center of said optical element mount as well as being equally spaced from each other.

8. The invention as set forth in claim 6 wherein each of said threaded rod means has a protrusion on its end and wherein said adjusting surface means includes slot means for allowing limited movement in the radial direction relative to the center of said optical element mount, such that said protrusions on said threaded rod means engage the slot means of said adjusting surface means whereby the movement of the protrusions in the slot means is substantially confined to radial movement relative to the center of the optical element mount to thereby facilitate angular adjustment of said optical element mount.

9. The invention as set forth in claim 3 wherein said centerpost is tubular and said optical element mount has an aperture therein at least partially coinciding with the tubular opening of the centerpost such that light passing through said centerpost will also pass through said aperture in said optical element mount, said aperture having a reticle therein to facilitate alignment of said optical element mount.

10. The invention as set forth in claim 6 wherein said threaded rod means comprises a primary threaded rod and a secondary threaded rod, said primary threaded rod having two ends, said protrusion being on its first end and external threads being on its second end, said secondary threaded rod also having first and second ends, said first end of said secondary threaded rod being tubular and having external and internal threads the internal threads of said secondary threaded rod being in threaded engagement with the external threads of said primary threaded rod, said support element having a plurality of threaded apertures, said external threads of said secondary threaded rod being in threaded engagement with a threaded aperture of said support element.

11. The invention as set forth in claim 10 wherein the external threads of said secondary threaded rods and the external threads of said primary threaded rods have different threads per inch ratios.

12. The invention as set forth in claim 2 wherein said optical element mount has a rearward surface facing said support element which in conjunction with the portion of said adjusting surface means which contains the abutting surface defines an open space such that when said pivotally connecting means is in said locking mode and force is induced by said adjustment means against said abutting surface, said adjusting surface mans may flex into said open space without effecting the angular position or causing distortion of said optical element mount.

13. A device for pivotally supporting an element comprising:
 a support frame;
 a centerpost axially slidable within said support frame;
 an element mount pivotally supported on said centerpost;
 said centerpost having a flange at one end and a threaded portion at the opposite end;
 said mounting element having an annular receptacle defining a surface which slidably engages said centerpost flange;
 said element mount including means for providing an adjusting surface capable of limited flexure relative to the mounting element;
 adjustment means extending from said support frame to said adjusting surface means for adjusting the angular position of said mounting element;
 a lock nut in threaded engagement with the threaded portion of said centerpost, whereby when said lock nut is tightened against said support frame said flange of said centerpost frictionally engages said surface of said annular receptacle and forces the adjusting surface means against the adjustment means thereby preventing pivotal movement of said mounting element relative to said support frame.

14. The invention as defined in claim 13 wherein said adjustment means include a plurality of threaded rods.

15. The invention as defined in claims 13 or 14 wherein said adjusting surface means comprises an abutment surface and said adjustment means includes an abutment end, said abutment end slidably engaging said abutment surface and capable of movement across said abutment surface in at least one direction.

16. The invention as defined in claim 15 wherein said abutment surface is located in an indented slot in said adjusting surface means, said slot extending in a radial direction whereby said abutment end may slide along said abutment surface only in a radial direction.

* * * * *